(12) United States Patent
Hoeppel et al.

(10) Patent No.: US 10,486,653 B2
(45) Date of Patent: Nov. 26, 2019

(54) FILLING DEVICE FOR A FLUID CONTAINER OF A VEHICLE, HAVING AN EXTENDABLE FILLING COMPONENT

(71) Applicant: Brose Fahrzeugteile GmbH & Co. KG, Coburg, Coburg (DE)

(72) Inventors: Michael Hoeppel, Bad Staffelstein (DE); Maik Rienecker, Memmelsdorf (DE); Christian Herrmann, Coburg (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 368 days.

(21) Appl. No.: 15/302,137

(22) PCT Filed: Mar. 26, 2015

(86) PCT No.: PCT/EP2015/056592
§ 371 (c)(1),
(2) Date: Jan. 25, 2017

(87) PCT Pub. No.: WO2015/155021
PCT Pub. Date: Oct. 15, 2015

(65) Prior Publication Data
US 2017/0174186 A1   Jun. 22, 2017

(30) Foreign Application Priority Data
Apr. 8, 2014   (DE) .................. 10 2014 206 780

(51) Int. Cl.
*B60S 1/50* (2006.01)
*B60S 1/48* (2006.01)
*F16L 27/12* (2006.01)

(52) U.S. Cl.
CPC .............. *B60S 1/50* (2013.01); *B60S 1/481* (2013.01); *F16L 27/12* (2013.01)

(58) Field of Classification Search
CPC .... B60S 1/50; F16L 27/12; F01M 2011/0491; B67C 11/00; B60K 15/04–0409
(Continued)

(56) References Cited

U.S. PATENT DOCUMENTS 5,857,504 A * 1/1999 Tremblay ................ B67C 11/02
141/338
5,946,763 A    9/1999 Egner-Walter et al.
(Continued)

FOREIGN PATENT DOCUMENTS

DE    195 01 210 A1    7/1996
DE    198 33 465 A1    2/2000
(Continued)

*Primary Examiner* — Andrew D StClair
(74) *Attorney, Agent, or Firm* — Lewis Roca Rothgerber Christie LLP

(57) ABSTRACT

A filling device for a fluid container of a vehicle is provided. The filling device comprises at least a motorized drive, a filling component which can be extended by means of the drive from a rest position to a filling position on the vehicle, and on which a filling opening is provided which is accessible in the filling position for filling a fluid container with fluid and a filling element which is adjustably mounted on the filling component and defines at least one edge portion on the perimeter of the filling opening when the filling component is in its filling position. The filling opening is in the filling position accessible for filling of fluid irrespective of a position of the filling element on the extended filling component. Only the perimeter of the filling opening can be enlarged by the filling element when the filling component is in its filling position.

20 Claims, 6 Drawing Sheets

(58) Field of Classification Search
USPC .................................................. 220/834, 837
See application file for complete search history.

(56) References Cited

U.S. PATENT DOCUMENTS

| | | | | |
|---|---|---|---|---|
| 6,223,793 | B1* | 5/2001 | Donoughe | B60S 1/50 141/331 |
| 6,257,500 | B1* | 7/2001 | Petzold | B60S 1/481 239/284.1 |
| 7,134,709 | B2* | 11/2006 | Valois | B60J 5/0472 296/146.11 |
| 9,120,465 | B2* | 9/2015 | Uyanik | B67C 11/02 |
| 9,422,841 | B2* | 8/2016 | Goldstein | F01M 11/04 |
| 2004/0142232 | A1* | 7/2004 | Risca | B60H 1/00514 429/100 |

FOREIGN PATENT DOCUMENTS

| | | |
|---|---|---|
| DE | 100 28 701 A1 | 12/2001 |
| DE | 101 60 930 A1 | 6/2003 |
| DE | 103 36 847 A1 | 3/2005 |
| DE | 102 012 007 997 A1 | 10/2013 |
| FR | 2909363 A3 | 6/2008 |
| FR | 2927296 A1 | 8/2009 |
| FR | 2943303 A1 | 9/2010 |
| GB | 2485797 A | 5/2012 |

* cited by examiner

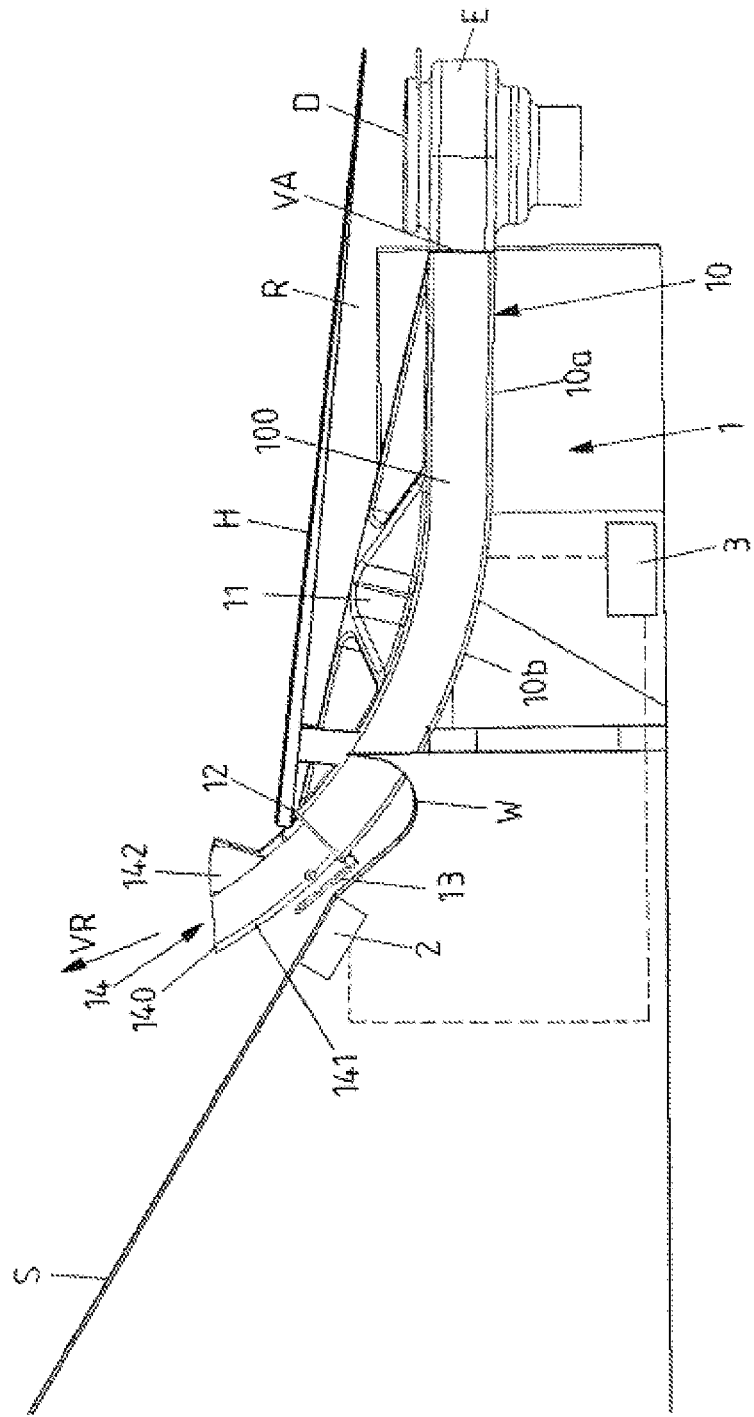

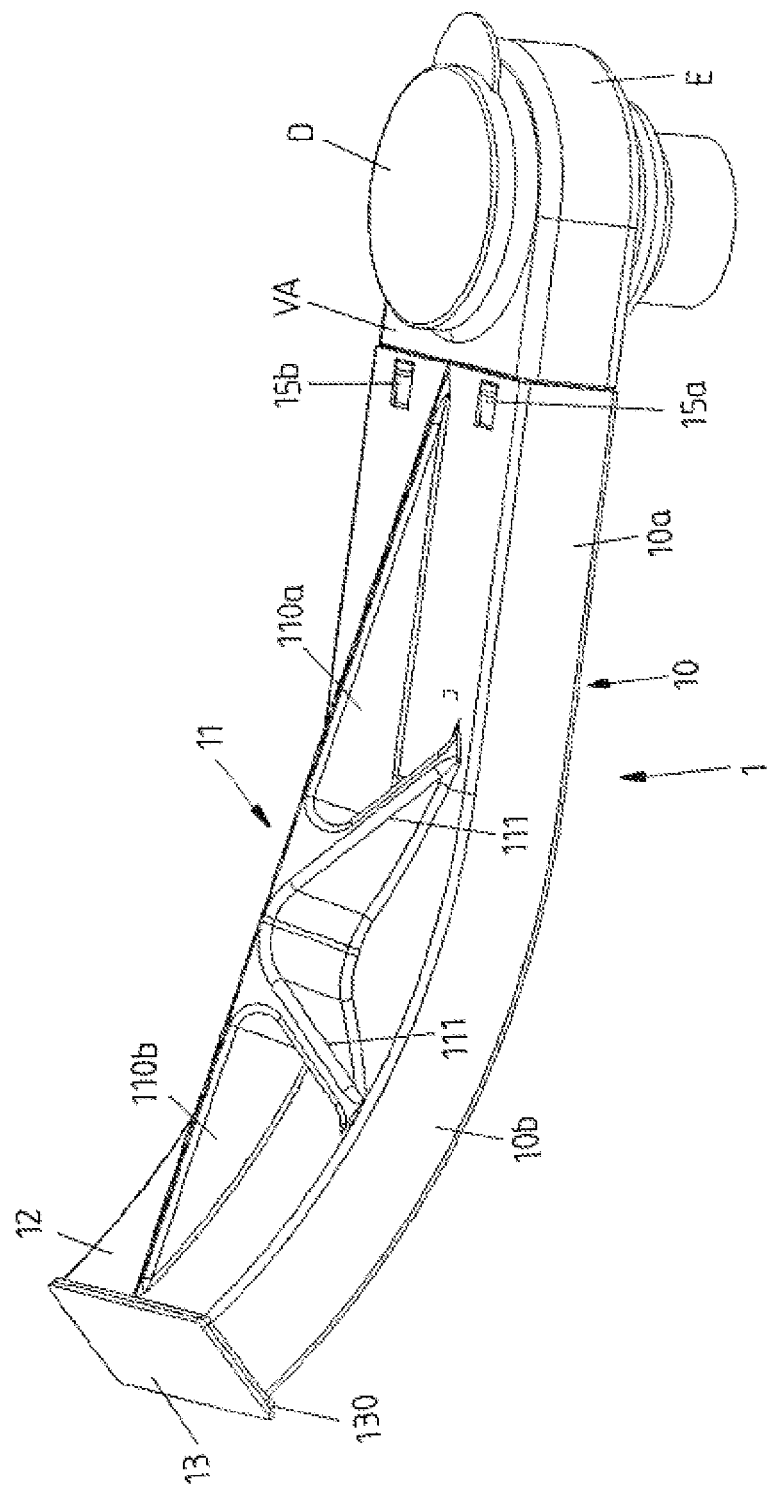

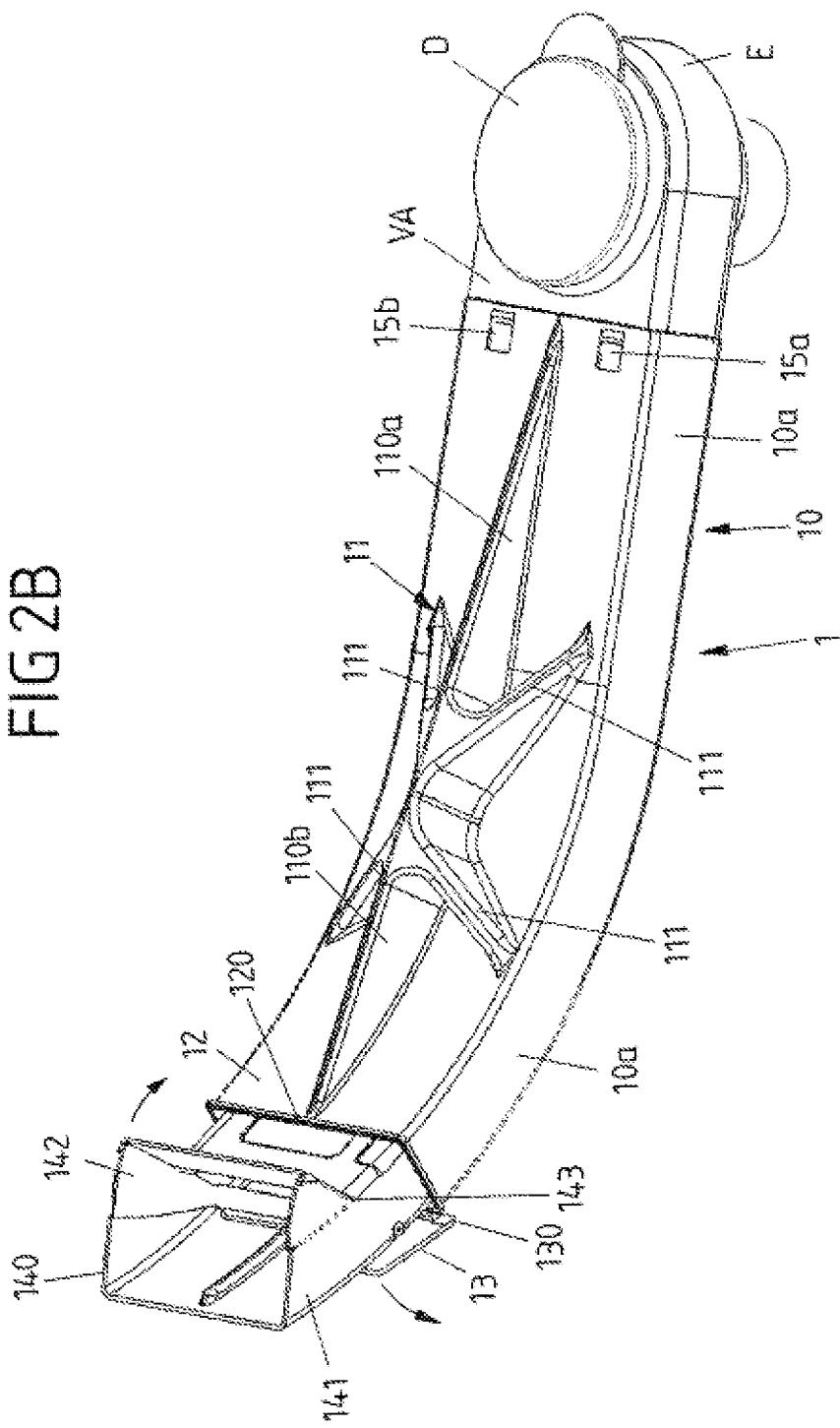

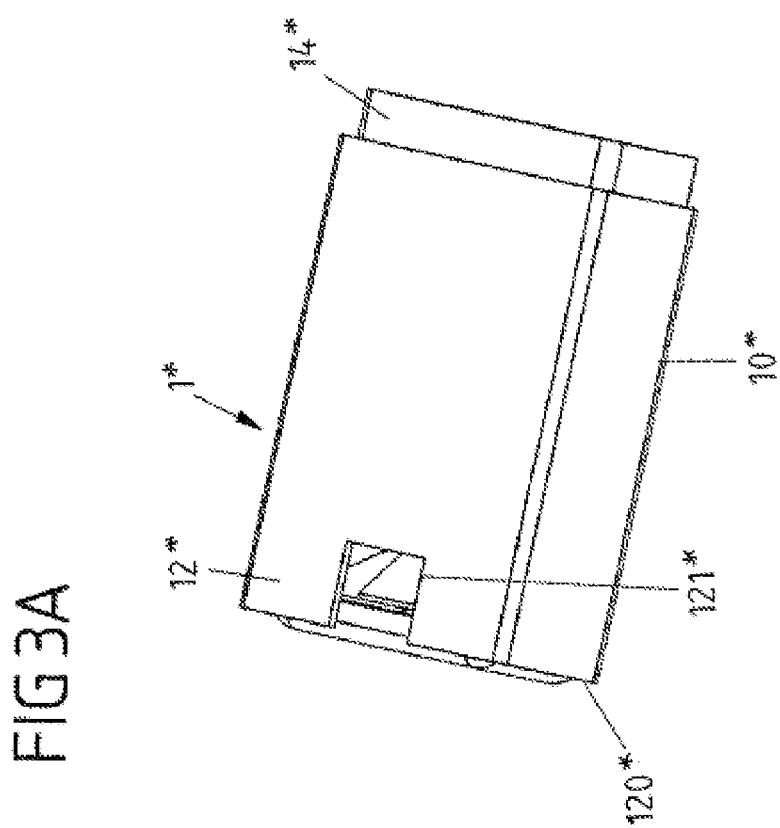

FILLING DEVICE FOR A FLUID CONTAINER OF A VEHICLE, HAVING AN EXTENDABLE FILLING COMPONENT

CROSS-REFERENCE TO A RELATED APPLICATION

This application is a National Phase Patent Application of International Patent Application Number PCT/EP2015/056592, filed on Mar. 26, 2015, which claims priority of German Patent Application Number 10 2014 206 780.4, filed on Apr. 8, 2014, the entire contents of all of which are hereby incorporated by reference.

BACKGROUND

The present invention concerns a filling device for a fluid container of a vehicle, wherein the filling device comprises at least one filling component which can be extended from a rest position into a filling position on the vehicle, and on which a filling opening is provided which is accessible in the filling position for filling a fluid container with fluid.

Via such a filling component, for example, screen-wash may be added to a screen-wash container which is normally located in the engine bay of a motor vehicle. Because of the adjustable filling component, it is easier for a user to fill the container since the filling component can be extended to provide a filling opening for example on the motor vehicle, without needing to open the engine hood of the motor vehicle.

DE 103 36 847 A1 has already proposed arranging a filling opening in a region below a vehicle windscreen and making this filling open accessible via a movable engine hood or a cover separate from the engine hood. The filling opening is however arranged comparatively deeply here, and thus despite the arrangement in a region below the windscreen, under certain circumstances is still difficult to access from the side. To add fluid, a user in practice need often insert a separate filling funnel in the filling opening in order to add fluid via this. Since, in the device in DE 103 36 847 A1, always either the engine hood or a separate cover must be moved or removed manually to gain access to the filling opening, the operating comfort for a user is substantially restricted, in particular since he/she must already dirty his/her hands to gain access to the filling opening.

DE 198 33 465 A1 proposes, in particular in this context, providing an extendable filling component in or on an engine bay of a motor vehicle. This filling component can be extended when required via e.g. an operating mechanism accessible in the interior of the vehicle. A filling opening may here be provided on the top or side face of the extendable filling component. In a variant embodiment, a filling element is provided which is pivotably mounted on the extendable filling component and takes the form of a closure, via which an end portion of the filling opening is defined when the filling element is in its extended filling position. The filling element here folds outward from a closed position when the filling component is fully extended. The size of the filling opening is defined exclusively by the filling element which in the deployed state protrudes laterally from the filling component in the manner of a filling funnel.

Since the foldable filling element of DE 198 33 465 A1 defines a perimeter edge of the filling opening only in the filling position of the then extended filling component, and otherwise the filling component is completely closed, the problem can arise that when the filling component is extended, the filling element remains folded up and hence no filling opening is available. Thus for example if the foldable filling element seizes, or if in winter the filling element ices up, no fluid can therefore be added, although the filling component on which the filling element is movably mounted can be extended and retracted as required.

SUMMARY

The present invention is therefore based on the object of further improving a filling device, and in particular increasing the operating comfort for a user and minimizing the risk that, on any malfunction or failure of parts of the filling device, it is no longer possible to add fluid to a fluid container, a screen-wash container or oil or coolant reservoir.

This object is achieved with a filling devices as described herein.

According to a first aspect of the invention, a filling device is proposed which comprises at least the following:
- a motorized drive,
- a filling component which can be extended by means of a drive, and hence operated under external force, from a rest position to a filling position on the vehicle, and on which a filling opening is provided which is accessible in the filling position for filling a fluid container with fluid, and
- a filling element which is adjustably mounted on the filling component and which can enlarge at least perimeter or perimeter edge of the filling opening when the filling component is in the filling position, while in the filling position the filling opening is accessible for filling of fluid independently of a position of the filling element.

According to the invention, it is consequently proposed that a filling opening is not provided or opened only by adjustment of the filling element provided on the filling component, but when the filling component is extended, a filling opening is always provided for filling of fluid, this however undergoes an enlargement of its perimeter due to the adjusted filling element in order to facilitate the filling. The filling component is thus extendable with the filling opening already accessible and not closed. Further adjustment of the filling element during or after extension of the filling component simply enlarges the perimeter of the filling opening.

Here an adjustment mechanism may be provided via which the filling element can automatically be moved into an adjustment position on the filling component, in which the perimeter of the filling opening is enlarged by the filling element. On fault-free operation of the filling device therefore, via the motorized drive and on an activation event, the extension of the filling component is triggered and also the filling element adjusted accordingly so that in extended state, i.e. in the filling position of the filling component, the filling opening is available with the maximum possible perimeter.

The filling element may here, at least in its adjusted position in which the dimensions of the filling opening are at a maximum, form a filling slope and/or a filling funnel in order to further facilitate the filling with fluid.

In order to be able to vary the dimensions of the filling opening via the filling element, this is for example mounted displaceably and/or pivotably on the extendable filling component.

In one embodiment variant, alternatively or additionally, a filling element is arranged expandably on the extendable filling component. Here the filling component may be extendable in an adjustment direction from its rest position, and the filling element may be expandable in another spatial direction via individual flexible segments, and/or segments which are moveable relative to each other and even foldable. For example, the filling element may be expanded substantially radially relative to an axis which runs approximately perpendicular to the adjustment direction of the filling component. For example, in this context it may be provided that a filling component extends laterally and the filling element thereon expands inter alia upward, for example unfolds, so that a filling funnel open at the top is formed above the expanded filling element.

Preferably, a filling device according to the invention is provided for a fluid container arranged in the engine bay of a motor vehicle, e.g. for a screen-wash, coolant or oil reservoir. In the rest position of the filling component, the filling device is here—depending on application—preferably arranged almost completely in the engine bay and/or below a engine hood. In one exemplary embodiment, it is accommodated in the region of a cowl so that the filling component can be extended in the region of this cowl between a windscreen and the engine hood of the vehicle.

For better accessibility of the filling opening provided on the filling component, the filling device may, in particular in this context, be arranged such that the filling component extends eccentrically. The filling device may also be configured such that in installed state, the retracted filling component is arranged as closely as possible to the upper edge of the engine hood in order to largely prevent covering with snow and ice in winter.

In order to prevent the ingress of dirt and/or moisture into the filling opening, this is preferably tightly sealed in the rest position of the filling component. A corresponding closure may for example be provided on a connecting channel of the filling device, in or on which the filling component is displaceably guided. Via such a connecting channel, fluid introduced via the filling opening of the filling component can flow in the direction of the fluid container. At the end of this connecting channel, an extension opening is provided, out of which the filling component can be extended. An additional closure may then be provided in the region of this extension opening. A closure may for example here be formed with a hinged and spring-loaded closing cover. Such a closing cover is for example pretensioned in a closed position and is folded open by the extending filling component. In a variant embodiment, the connecting channel is (tightly) sealed by a portion of the retracted filling component which is therefore in its rest position. An additional closing cover is thus not absolutely essential in this variant.

In one embodiment variant, the connecting channel in or on which the filling component is displaceably guided comprises at least one preferably concavely curved portion. The connecting channel is here for example curved such that the connecting channel, when correctly installed in a engine bay of the motor vehicle, points outward with an end on which the filling component is extendable. Consequently, the connecting channel gives the filling component a curved adjustment track so that the filling component may for example thus be extended past an edge of the engine hood. Preferably, for this the connecting channel is configured such that when correctly installed, it runs with at least one portion substantially along the underside of the engine hood of a motor vehicle, and via its further curved portion points outward at one end of the engine hood in the region below the windscreen. An outlet opening for the filling component provided on the connecting channel may therefore simply be arranged in the region of a cowl, in particular on or in a cowl cover below the windscreen, and the filling component may be extended substantially upward at the curved (end) portion although the majority of the connecting channel extends substantially along the underside of the engine hood.

To reinforce the connecting channel, this may have a rib structure on a casing surface. In one embodiment variant, this rib structure has at least one longitudinal rib running in the extension direction of the connecting channel, and/or several transverse ribs running substantially obliquely and/or transversely thereto. In one exemplary embodiment, several ribs are formed on an outer casing surface, running in a star pattern relative to a center axis of the connecting channel.

In one exemplary embodiment, the connecting channel on or in which the extendable filling component is displaceably held and guided, may be connected to a filling nozzle of the fluid container. For example, a catch connection is provided for this so that a connecting element comprising the connecting channel can easily be press-fitted without tools onto the connecting portion of the filling nozzle provided for this. The filling device with the extendable filling component may thus be easily mounted thereon, fitted after production, and exchanged.

The filling nozzle to be connected to the connecting channel may here also comprise a separate filling opening for filling the fluid container with fluid. Thus via the filling nozzle and its separate filling opening, the fluid container can be filled with fluid also independently of the filling component. This ensures that a user can still add fluid even if the extendable component is no longer functioning.

In addition, with such a filling device, two design variants can easily be provided. In a first design variant, fluid can only be filled via the filling opening at the filling nozzle. The filling opening is for example conventionally closed by a separate cover which is located below the engine hood and can only be removed when the engine hood is open. In a second design variant, the additional connecting channel with the filling component mounted adjustably therein or thereon is connected to the filling nozzle so that fluid can be added either via the filling opening of the filling component or via the separate filling opening on the filling nozzle. Different filling nozzles may be provided for the two design variants, the one with and the other without the connecting channel, or one and the same filling nozzle may be used, on which the additional connecting channel with the adjustable filling component may be arranged, in particular press-fitted, if required.

A filling device with a filling nozzle on which a separate filling opening is provided may offer additional advantages in terms of user comfort and safety, irrespective of whether an adjustable filling element to enlarge the perimeter of a filling opening is provided on the filling component, or the adjustment of the filling component can be controlled via a motorized drive under external force.

A second aspect of the invention is therefore based on a filling device which comprises at least the following:
  a filling component which can be extended from a rest position into a filling position on the vehicle either manually or under external force, and on which a filling opening is provided which is accessible in the filling position for filling the fluid container with fluid, and
  a filling nozzle connected to the fluid container, via which fluid filled into the filling opening of the extended filling component enters the fluid container, and which has a separate filling opening for filling the fluid container with fluid, so that the fluid container can be filled with fluid at the filling nozzle also independently of the filling component.

Evidently, it is also possible to combine the two said aspects of the invention, so that for example a motorized drive for adjusting the filling component is also provided on a filling device with a filling nozzle which provides an additional filling opening, and a filling element for enlarging the perimeter of the filling opening is mounted adjustably on the filling component.

In principle, a filling device according to the first or second aspect of the invention may be configured in modular fashion such that the filling component forms a functional, pre-testable module with the connecting element on which the filling component is mounted movably and which may also form a connecting channel.

Such a module may be connected to a filling nozzle which forms a connection to a fluid container provided in the vehicle. In this way for example, a filling device with an adjustable filling component operated by external force may constitute an optional special equipment which can be fitted after production at customer request and mounted on an existing filling nozzle of the respective fluid container, which preferably has a corresponding mechanical interface for this.

To control the filling component so that this is adjusted under external force from a filling position into its rest position and/or from its rest position into a filling position, control electronics with at least one sensor element may be provided.

An activation event triggered by a user may here be detected contactlessly for example by the at least one sensor element, in order to adjust the filling component automatically. In one exemplary embodiment, a (swiping) gesture of a user is detected by at least one sensor element which works for example inductively or capacitively, automatically leading to the extension and/or retraction of the filling component. Via such control electronics, the adjustment of the filling component can consequently be controlled by gestures of the user.

Alternatively or additionally, a fill level of the fluid container may be able to be analyzed via at least one sensor element, in order to control the adjustment of the filling component. In this way, it may for example be provided that the extended filling component automatically moves back to its rest position and is thus retracted when a maximum fill level in the fluid container is reached by filling with fluid.

In one embodiment variant, via at least one fill level sensor element, a fill level of the fluid container can be detected in order to emit an acoustic and/or visual fill level signal and thus inform a user of the fill level of the fluid container. In such an embodiment variant, a display element via which the user is visually informed of the fill level, may be provided e.g. on the extendable filling component. A fill level display may be arranged on the filling component such that the fill level display can only be seen by a user when the filling component is extended.

In order to prevent blockage of the extendable filling component in cold weather, in addition at least one heating element may be provided, e.g. in the form of a heatable wire. This prevents freezing of the adjustable components of the filling device, e.g. the filling component, a filling element adjustably mounted thereon, and/or a closure for closing an outlet opening from which the filling component may be extended. The heating element may here be provided for connection to a heating system already present in the vehicle. For example, it may be connected to the existing heating system for the washer nozzles of the vehicle.

BRIEF DESCRIPTION OF THE DRAWINGS

Further advantages and features of the invention will become clear from reading the following description of exemplary embodiments and with reference to the figures.

FIG. 1A-1B in extracts and in section view, a first variant of a filling device according to the invention installed on a vehicle, with the filling component retracted and extended.

FIG. 2A-2B in enlarged scale, parts of the filling device from FIGS. 1A-1B, with the filling component retracted and extended to a maximum.

FIG. 3A-3C in extract, a second variant of a filling device according to the invention with a filling component in various positions.

DETAILED DESCRIPTION

Figure 1A:
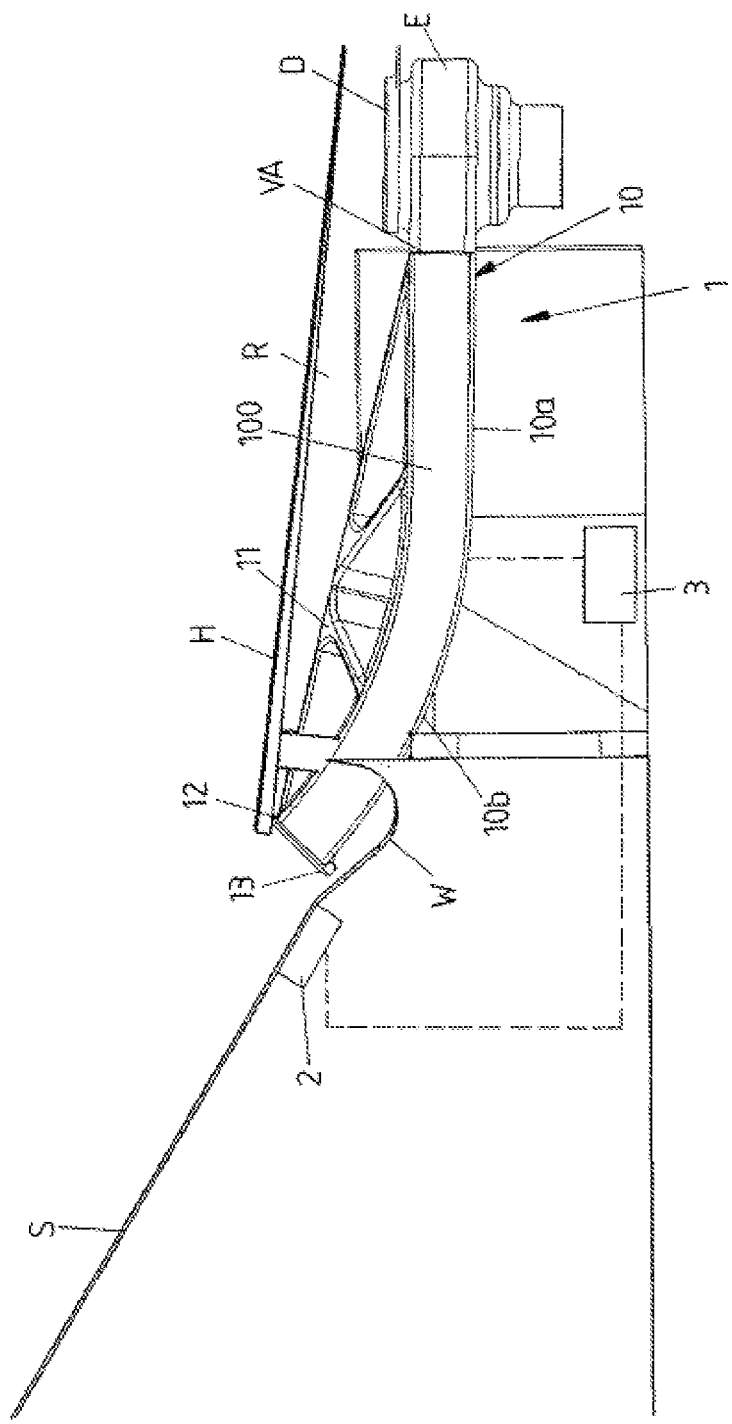

FIGS. 1A-1B and 2A-2B show a first variant of a filling device 1 according to the invention for a fluid container of the vehicle. The fluid container may for example be a screen-wash container or an oil or coolant reservoir. The filling device 1 is here largely accommodated in an engine bay R, below an engine hood H of the vehicle, when installed correctly. The filling device 1 here has a filling nozzle E connected to a fluid container, which is not shown here for reasons of clarity. This filling nozzle E has a filling opening which is closed by a cover D and via which, after opening the engine hood H and removing the cover D, the fluid container can be filled with fluid.

Furthermore, a hollow cylindrical connecting element 10 of the filling device 1 is press-fitted to the filling nozzle E at a side connecting portion VA, and defines a connecting channel 100. The filling nozzle E thus comprises, at the connecting portion VA, a mechanical interface for connection to the connection element 10 which defines the connecting channel 100. In the present case, a catch connection is provided to fix the connecting element 10 to the filling nozzle E. Catches provided on the connecting portion VA snap into catch openings 15a and 15b of the connecting element 10.

The connecting element 10 extends from the filling nozzle E firstly over a rectilinear portion 10a inside the engine bay R along the engine hood H. Via a further portion 10b connected thereto and with a concave curvature, the connecting element 10 with its connecting channel 100 points outward and ends at an end portion 12 with an outlet opening 120 in the region of a cowl W, which is provided below the windscreen S of the vehicle or at the rear end of the engine hood H. A filling component 14 of the filling device 1 may be extended out of the curved portion 10b through the outlet opening 120 in the region of the cowl W. In the extended state shown in FIGS. 1B and 2B, the filling component 14 extends beyond a rear edge of the engine hood H so that the filling component 14, and in particular a filling opening 140 provided thereon, is easily accessible to a user.

The filling component 14 is formed with a sleeve-like guide portion 141 via which the filling component 14 is displaceably mounted inside the connecting channel 100, which in the present case is rectangular in cross-section. In the exemplary embodiment of FIGS. 1A-1B and 2A-2B, the filling opening 140 is formed on an end face of the sleeve-like guide portion 141, so that the filling opening lies in a plane which runs substantially perpendicular to the adjustment direction VR in which the filling component 14 can be extended. Here the filling component 14 can be extended via a motorized drive (not shown in detail) on an activation event, out of the connecting element 10 in an adjustment direction VR, between the windscreen S and the engine hood H, into a filling position in order here for a fluid to be filled, which then reaches the fluid container via the connecting channel 100 and the filling nozzle E. The drive may be actively connected, for example via a Bowden cable or a drive spindle, to the filling component 14 in order to transmit an adjustment force to the filling component 14.

The adjustment movements of the filling component 14 are controlled by control electronics 3, via which the motorized drive can be controlled. The retraction and/extension of filling component 14 in the present case may be triggered by a gesture of a user, e.g. a swipe gesture in the lower region of the windscreen S. For this, at least one e.g. capacitative sensor element 2 is provided on the windscreen S. A sensor element 2 for contactless detection of an activation event, upon which an adjustment of the filling component 14 takes place, may evidently also be arranged on the cowl W, on any cover provided for the cowl W, or on the engine hood H.

Due to the adjustment of the filling component 14 under external force, it is possible to fill the respective fluid container with fluid without a user having to dirty his/her hands for this, and in particular without needing to open the engine hood H. The filling component 14 which extended automatically on a user event, rather provides an easily accessible filling opening 140 between the windscreen S and the engine hood H, without a user having to grip the filling component 14 directly or open the engine hood H.

In order for the filling opening 140 to have a larger perimeter in extended state of the filling component 14, an unfolding filling element 142 is adjustably mounted thereon. The filling element 142 is pivotably mounted on one side of the filling component 14, for example via a hinge joint 143, so that the filling element 142 may be folded out on extension of the filling component 14 in the direction of the engine hood H. Since the filling element 142 co-defines the perimeter edge of the outlet opening 140, the outlet opening is enlarged by this unfolding, and hence the adding of fluid facilitated. In its unfolded adjustment position, the filling element 142 forms a filling slope.

The filling element 142 in the present case is configured such that the filling opening 140 at the one open end of the filling component 14 is hereby enlarged to at least 1.5 or 2 times the size by the unfolding of the filling element 142.

The filling element 142 may for example be pretensioned in an unfolded adjustment position via at least one spring element. Thus the filling element 142 automatically swivels in the direction of the engine hood H when the filling component 14 is extended from the connecting element 10. To fold up the filling element 142, this is arranged on the filling component 14 such that on retraction of the filling component 14, the unfolded filling element 142 makes contact with an edge of the outlet opening 120, and on further retraction of the filling component 14 is thereby folded up again so far that the filling component 14 together with the filling element 142 can retract completely into the connecting channel 100.

In retracted state of the filling component 14, i.e. when the filling component 14 lies in its rest position inside the connecting element 10, the outlet opening 120 is preferably tightly sealed by a closing cover 13. This closing cover 13 is hinged onto the end of the connecting element 10, for example via a hinge joint 130, and pretensioned in the direction of the closed position via at least one spring element. The closing cover 13 is thus unfolded in an opening direction since the filling component 14 is pushed against this and out of the outlet opening 12. When the return of the closing cover 13 is no longer blocked by the fully or partially extended filling component 14, the closing cover 13 automatically folds up again and closes the outlet opening 120.

Also, in the correctly installed state, the outlet opening 12 is provided close to the upper edge of the engine hood H in order, in particular in winter, to avoid a covering with snow and ice as far as possible. The connecting element 10 with the connecting channel 100 is furthermore stiffened, in particular on the concavely curved casing surface, by a rib structure 11. This rib structure 11 has a plurality of ribs 110*a*, 110*b* and 111 arranged in a star pattern relative to a center axis of the connecting channel 100. In addition to two longitudinal ribs 110*a* and 110*b* extending over the entire length of the connecting element 10, several transverse ribs 111 are provided which are oriented obliquely thereto.

Figure 3B:
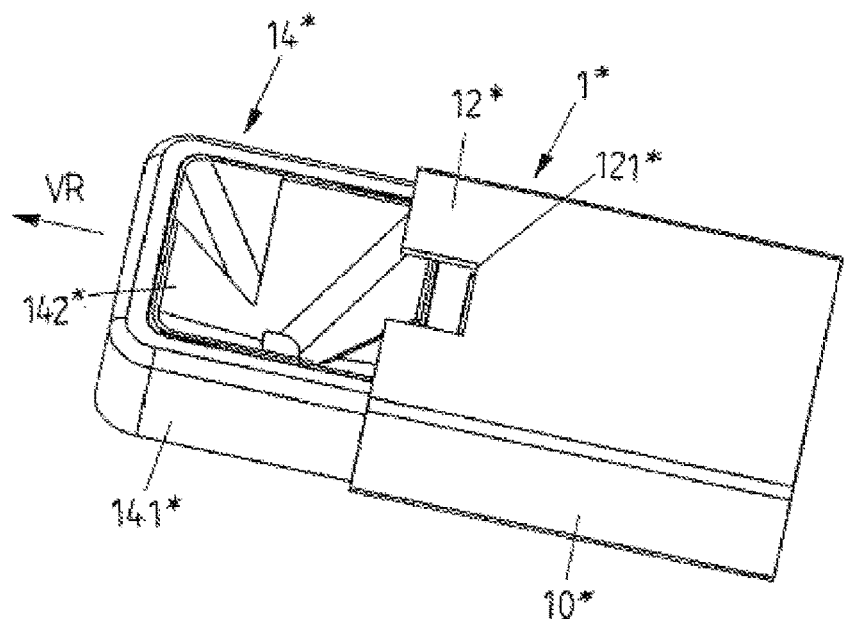
Figure 3C:
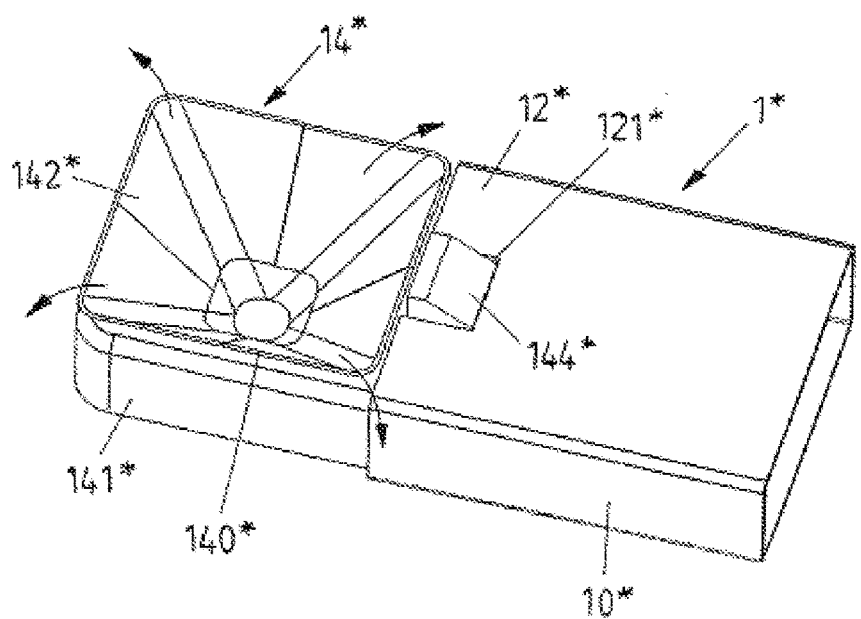

FIGS. 3A, 3B and 3C show a second variant of a filling device 1* according to the invention in extract.

The filling device 1* also has an adjustable filling component 14* which may be extended when required from a connecting channel of a connecting element 10*, shown here merely in shortened form. The filling component 14* here emerges at an outlet opening 120* at an end portion 12* of the connecting element 10*, wherein here, in retracted state of the filling component 14*, the outlet opening 120* is sealed preferably tightly by the filling component 14* itself. The connecting channel of the connecting element 10* is here again formed rectangular in cross-section. Thus in its rest position, the filling component 14* can close the outlet opening 120* from the inside with a corresponding rectangular end face on a guide portion 141* of the filling component 14*.

Thus a filling opening 140* is not provided on the filling component 14* on a side open in the adjustment direction VR of the filling component 14* (as in the exemplary embodiment of FIGS. 1A-1B and 2A-2B). Rather, in the variant of FIGS. 3A-3C, the filling opening 140* is defined by an expandable funnel-like filling element 142* on a side of the guide portion 141* oriented substantially parallel to the adjustment direction VR. The filling element 142* is here constructed from a plurality of segments which are moveable relative to each other and/or foldable, in some cases also flexible, such that the filling element 142* unfolds when the filling component 14* is extended to a maximum. The filling element 142*, here forming a filling funnel, is expanded substantially radially relative to a spatial axis which runs substantially perpendicular to the adjustment direction VR of the filling component 14*. Consequently, the filling element 142* in FIG. 3C expands upward and radially outward when the filling component 14* is extended as far as possible to the left in FIG. 3C from the connecting element 10*. Here again, via the filling element 142*, a filling opening 140* is always made available even if the filling element 142* does not unfold correctly, in order to enlarge the surface area of the filling funnel and the dimensions of the filling or upper funnel opening 120*.

To lock the filling component 14* in its fully extended filling position, an elastically adjustable catch 144* is provided on the guide portion 141*. This catch 144* engages in a catch opening 121*, provided on the end portion 12* of the connecting element 10*, when the filling component 14* has been extended to a maximum.

In this way, a filling device 1* from FIGS. 3A-3C is also ideal for manual adjustment. For example, the filling component 14* is extended under external force via a motorized drive, for example on activation of a switch or button or on a gesture of a user. To retract the filling component 14* into the connecting element 10*, a user must however first manually press in the catch 144*.

Evidently, a locking system via the catch 144* engaging in the catch opening 121* may also be configured such that the lock is automatically released on retraction of the filling component 14* into the connecting channel of the connecting element 10*. Consequently, it is also preferred if the filling funnel defined by the filling element 142* folds up automatically and the filling component 14* is retracted with the folded filling element 142*.

Preferably, a filling device 1, 1* is provided for filling a screen-wash reservoir with screen-wash fluid. It is however evidently also possible for an oil or coolant reservoir to be filled via a filling device 1, 1* according to the invention.

In the variants of a filling device 1, 1* shown, a filling opening 140, 140* significantly enlarged in comparison with the cross-section of the connecting channel 100 is provided, in the extended state of the filling component 14, 14*, via the filling element 142, 142* mounted pivotably on the filling component 14, 14*. Because the filling component 14, 14* is always open on one side, at the same time it is also ensured that when the filling component 14, 14* is extended, fluid can be added via the filling opening 140, 140* in any case, irrespective of whether the filling element 142, 142* has been unfolded or expanded correctly. In order to still be able to add fluid if the entire filling component 14, 14* can no longer be adjusted, a separate filling opening is provided via the filling nozzle E.

In a refinement, a filling device 1, 1* shown may be provided with a fill level display which may be stepless. Such a fill level display may for example be arranged on a region of the guide portion 141 which is visible in the filling position and protrudes out of the extension opening 120.

In one exemplary embodiment, it may be provided that the filling component 14, 14* retracts automatically when at least one sensor element detects the reaching of a specific fill level of a fluid present in the fluid container. Furthermore, to prevent blocking of the extendable filling component 14, 14* in cold weather, in addition a heating element, for example in the form of a heated wire, may be integrated. Such a heating element may for example be coupled to a heating system for washer nozzles which is already present.

In the present case, the filling device 1, 1* is constructed in modular fashion so that a module with the connecting element 10 and the filling component 14, 14* displaceably guided therein forms a pre-testable assembly. This assembly may be mounted on the filling nozzle E after production in order to provide an (additional) filling opening 140, 140* via the extendable filling component 14, 14*, which may preferably be controlled via a sensor, button, switch or other logic, and adjusted under external force.

LIST OF REFERENCE NUMERALS

1, 1* Filling device
10, 10* Connecting channel
10a, 10b Portion
100 Connecting channel
11 Rib structure
110a, 110b Longitudinal rib
111 Transverse rib
12, 12* End portion
120, 120* Extension opening
121* Catch opening
13 Closing cover
130 Hinge joint
14, 14* Filling component
140, 140* Filling opening
141, 141* Guide portion
142, 142* Filling element
143 Hinge joint
144* Catch
15a, 15b Catch opening
2 Sensor element
3 Control unit
D Cover
E Filling nozzle
H Engine hood
R Engine bay
S Windscreen
VA Connecting portion
VR Adjustment direction
W Cowl

The invention claimed is:

1. A vehicle comprising a fluid container and a filling device for the fluid container of a vehicle, the fluid container comprising at least:
   a filler which is motor-driven and is configured to be extended from a rest position to a filling position on the vehicle, and on which a filling opening is provided which is accessible in the filling position for filling the fluid container with fluid; and
   a filling opening expander which is adjustable on the filler and defines at least one edge portion on a perimeter of the filling opening when the filler is in its filling position,
   wherein, in the filling position of the filler, the filling opening is accessible for filling of fluid irrespective of a position of the filling opening expander on the filler, and the filling opening expander is adjustable to enlarge the perimeter of the filling opening when the filling component filler is in its filling position in order to facilitate filling fluid to the fluid container via the enlarged perimeter of the filling opening, and
   wherein the filling opening expander forms a portion of the perimeter of the filling opening of the filler in the rest position, and the filling opening expander is configured such that retraction of the filler from the filling position to the rest position causes the filling opening expander to decrease a size of the perimeter of the filling opening.

2. The vehicle as claimed in claim 1, wherein the filling opening expander is mechanically adjustable and can automatically be adjusted into an adjustment position on the filler, in which the perimeter of the filling opening is enlarged by the filling opening expander.

3. The vehicle as claimed in claim 1, wherein the filling opening expander forms a portion of at least one filling slope.

4. The vehicle as claimed in claim 1, wherein the filling opening expander is mounted displaceably and/or pivotably on the filler.

5. The vehicle as claimed in claim 1, wherein the filling opening expander is arranged expandably on the filler.

6. The vehicle as claimed in claim 5, wherein the filler is displaceably guided in a connecting channel in which fluid filled via the filling opening can flow in the direction of the fluid container.

7. The vehicle as claimed in claim 6, wherein the connecting channel has at least one curved portion.

8. The vehicle as claimed in claim 6, wherein a rib structure is provided on a casing surface of the connecting channel the rib structure having at least one rib running longitudinally relative to an extension direction of the connecting channel.

9. The vehicle as claimed in claim 6, wherein the connecting channel is connected to a filling nozzle of the fluid container.

10. The vehicle as claimed in claim 9, wherein the filling nozzle comprises a separate filling opening for filling the fluid container with fluid.

11. The vehicle of claim 1, wherein the filling device further comprises:
 a filling nozzle connected to the fluid container; and
 a filling component filler connected to a side connecting portion of the filling nozzle,
 wherein the filling nozzle has a separate filling opening for filling the fluid container with fluid, so that the fluid container can be filled with fluid at the filling nozzle also independently of the filling component filler.

12. The vehicle as claimed in claim 11, wherein a connector is provided to which the filler is movably mounted and the filling device is configured in modular fashion such that the connector and the filler form a module configured for connection to a filling nozzle connected to the fluid container.

13. The vehicle as claimed in claim 12, wherein control electronics with at least one sensor are provided to control adjustment of the filler from the filling position to the rest position and/or from the rest position to the filling position.

14. The vehicle as claimed in claim 13, wherein the at least one sensor is configured for a contactless detection of an activation event triggered by a user in order to adjust the filler.

15. The vehicle according to claim 13, wherein the at least one sensor is configured for analyzing a fill level of the fluid container for controlling an adjustment of the filler.

16. The vehicle as claimed in claim 11, wherein a connector is provided to which the filler is movably mounted and the filling device is configured in modular fashion such that the connector and the filler form a module configured for connection to a filling nozzle connected to the fluid container.

17. The vehicle as claimed in claim 16, wherein the filling opening expander is formed by at least one filling funnel.

18. The vehicle as claimed in claim 16, wherein the filling opening expander is mounted pivotably on the filler.

19. The vehicle as claimed in claim 6, wherein a rib structure is provided on a casing surface of the connecting channel comprising several ribs running substantially obliquely relative to the extension direction of the connecting channel.

20. The vehicle as claimed in claim 6, wherein a rib structure is provided on a casing surface of the connecting channel comprising several ribs running transversely relative to the extension direction of the connecting channel.

* * * * *

UNITED STATES PATENT AND TRADEMARK OFFICE
CERTIFICATE OF CORRECTION

PATENT NO.        : 10,486,653 B2                                    Page 1 of 1
APPLICATION NO.   : 15/302137
DATED             : November 26, 2019
INVENTOR(S)       : Michael Hoeppel et al.

It is certified that error appears in the above-identified patent and that said Letters Patent is hereby corrected as shown below:

In the Claims

| | |
|---|---|
| Column 10, Line 60, Claim 6 | delete "claim 5," and insert -- claim 1, -- |
| Column 11, Line 19, Claim 12 | delete "claim 11," and insert -- claim 1, -- |
| Column 11, Line 25, Claim 13 | delete "claim 12," and insert -- claim 1, -- |
| Column 12, Line 15 (approx.), Claim 17 | delete "claim 16," and insert -- claim 1, -- |
| Column 12, Line 17 (approx.), Claim 18 | delete "claim 16," and insert -- claim 1, -- |

Signed and Sealed this
Seventeenth Day of November, 2020

Andrei Iancu
*Director of the United States Patent and Trademark Office*